(12) United States Patent
Bedi

(10) Patent No.: US 7,029,196 B2
(45) Date of Patent: Apr. 18, 2006

(54) CLOCK LOCK

(75) Inventor: Daljit S. Bedi, Mississauga (CA)

(73) Assignee: Navreet Kainth, Ontario (CA)

( * ) Notice: Subject to any disclaimer, the term of this patent is extended or adjusted under 35 U.S.C. 154(b) by 117 days.

(21) Appl. No.: 10/849,467

(22) Filed: May 20, 2004

(65) Prior Publication Data

US 2004/0213632 A1    Oct. 28, 2004

Related U.S. Application Data

(63) Continuation-in-part of application No. 09/854,376, filed on May 15, 2001.

(51) Int. Cl.
*F16D 1/00* (2006.01)

(52) U.S. Cl. ............... 403/352; 403/348; 403/350; 403/325; 403/328; 411/316; 411/318; 411/549; 411/553; 244/131

(58) Field of Classification Search .......... 403/31, 403/325, 327, 328, 330, 348, 350, 351, 352; 24/701, 702; 70/188, 189, 222; 244/131, 244/140; 411/19, 20, 315, 316, 317, 318, 411/349, 549, 553
See application file for complete search history.

(56) References Cited

U.S. PATENT DOCUMENTS

| 4,296,689 | A |   | 10/1981 | Hardesty |
| 4,753,091 | A |   | 6/1988  | Sheets |
| 4,782,561 | A |   | 11/1988 | Hayama |
| 4,964,594 | A | * | 10/1990 | Webb ............... 244/131 |
| 5,356,249 | A |   | 10/1994 | Hove |
| 5,626,435 | A | * | 5/1997  | Wohlhuter ......... 403/348 |
| 5,803,648 | A |   | 9/1998  | Foy |
| 5,855,449 | A |   | 1/1999  | Thomas |
| 5,855,451 | A | * | 1/1999  | Milton et al. ....... 403/348 |
| 5,893,284 | A |   | 4/1999  | Hrabal |
| 5,893,692 | A |   | 4/1999  | Asanuma |
| 6,113,305 | A | * | 9/2000  | Takaguchi ......... 403/321 |
| 6,164,862 | A |   | 12/2000 | Takaguchi |

FOREIGN PATENT DOCUMENTS

| DE | 32 07 420 | * | 8/1983 |
| DE | 32 07 420 |   | 9/1983 |

* cited by examiner

*Primary Examiner*—Daniel P. Stodola
*Assistant Examiner*—Michael P. Ferguson
(74) *Attorney, Agent, or Firm*—Young & Thompson

(57) ABSTRACT

A system for joining two components includes a rotatable locking member having a pair of diametrically opposed notches, a pair of diametrically opposed first sectors having a first radius, and a pair of diametrically opposed second sectors having a second radius larger than the first radius. A shaft is attached to and extends axially from the locking member. One of the components has a cavity and an opening for inserting the locking member into the cavity. The other component has a receptacle for holding an end of the shaft opposite the locking member so that the shaft holds the two components together.

14 Claims, 13 Drawing Sheets

CLOCK LOCK

This is a continuation-in-part application of U.S. patent application Ser. No. 09/854,376 filed May 15, 2001 now U.S. Pat. No. 6,769,832, and claims the benefit thereof. All of the subject matter of that application is incorporated herein by reference.

BACKGROUND OF THE INVENTION

This invention relates to a coupling device for joining two components that is easy to assemble and disassemble.

SUMMARY OF THE INVENTION

A system for joining two components includes a rotatable disc in a cavity in one component, where the disc has a pair of diametrically opposed notches, a pair of diametrically opposed first sectors having a first radius, and a pair of diametrically opposed second sectors having a second radius larger than the first radius. The one component includes an opening smaller than the cavity and into which the disc is inserted; the cavity being large enough to permit rotation of the disc once inserted therein. Upon rotation of the disc, a movable stopper in the one component is urged into the cavity at a position where the stopper engages one of the first sectors when a pin in the one component engages one of the notches and one of the second sectors is between the one first sector and the notch engaging the pin. A shaft extends axially from the rotatable disc through the opening and has a distal end that engages the second component so that the shaft holds the two components together when the rotatable disc is inserted into the cavity in the one component and rotated and the other end of the shaft is held by the second component.

BRIEF DESCRIPTION OF THE DRAWINGS

Embodiments of the present invention will now be described, by way of example, with reference to the accompanying drawings, in which.

DESCRIPTION OF PREFERRED EMBODIMENTS

Figure 1:
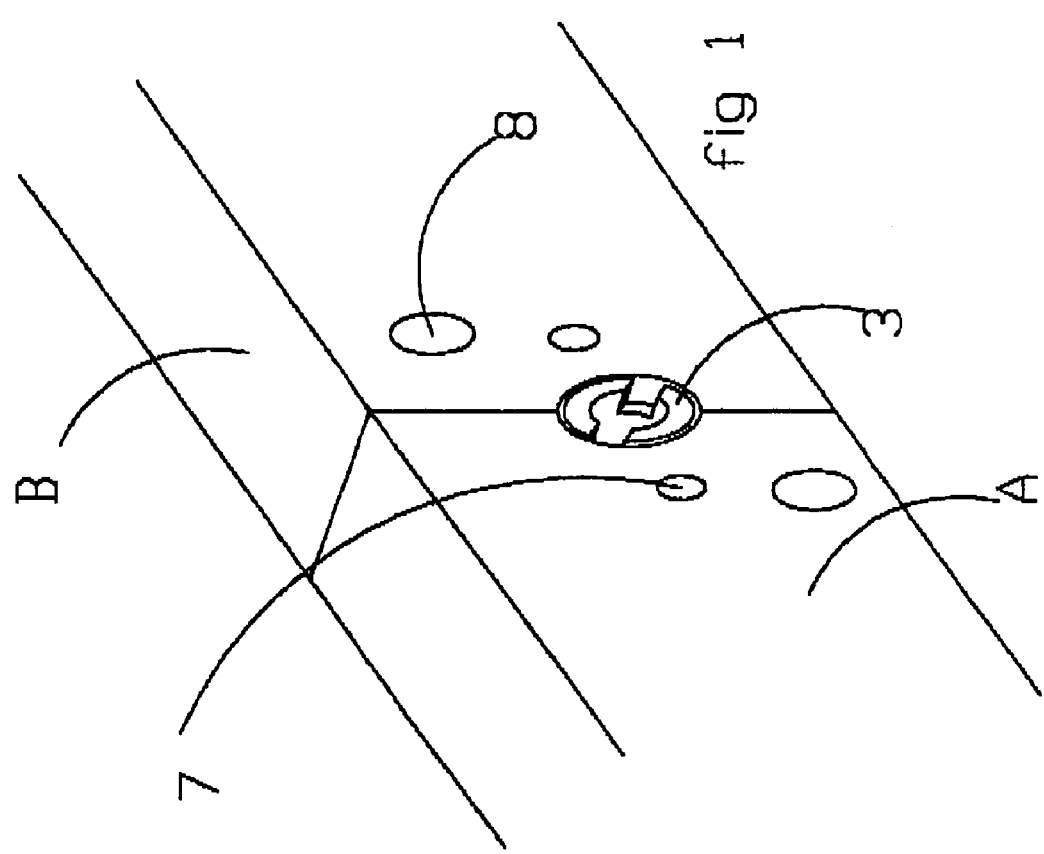
FIG. 1 is an assembled view of two rails at the joint in a first embodiment of the invention.

In one embodiment, the invention is a coupling device for joining two rails A, B end-to-end, such as shown in FIG. 1. This arrangement offers a flat surface on all sides at the joint, which allows wheels to travel along the rail without obstruction. This embodiment employs a rotatable member between the rail ends that has diametrically opposed arms that each grabs a respective pin 7 in a respective rail end. The rotatable member is held in a locked position by stoppers that extend radially inward from the respective rail ends and is released by pushing the stoppers radially outward. That is, in this embodiment, the rails are held together by the strength of the pins in the rail ends and of the arms of the rotatable member that grasp the pins.

Figure 2:
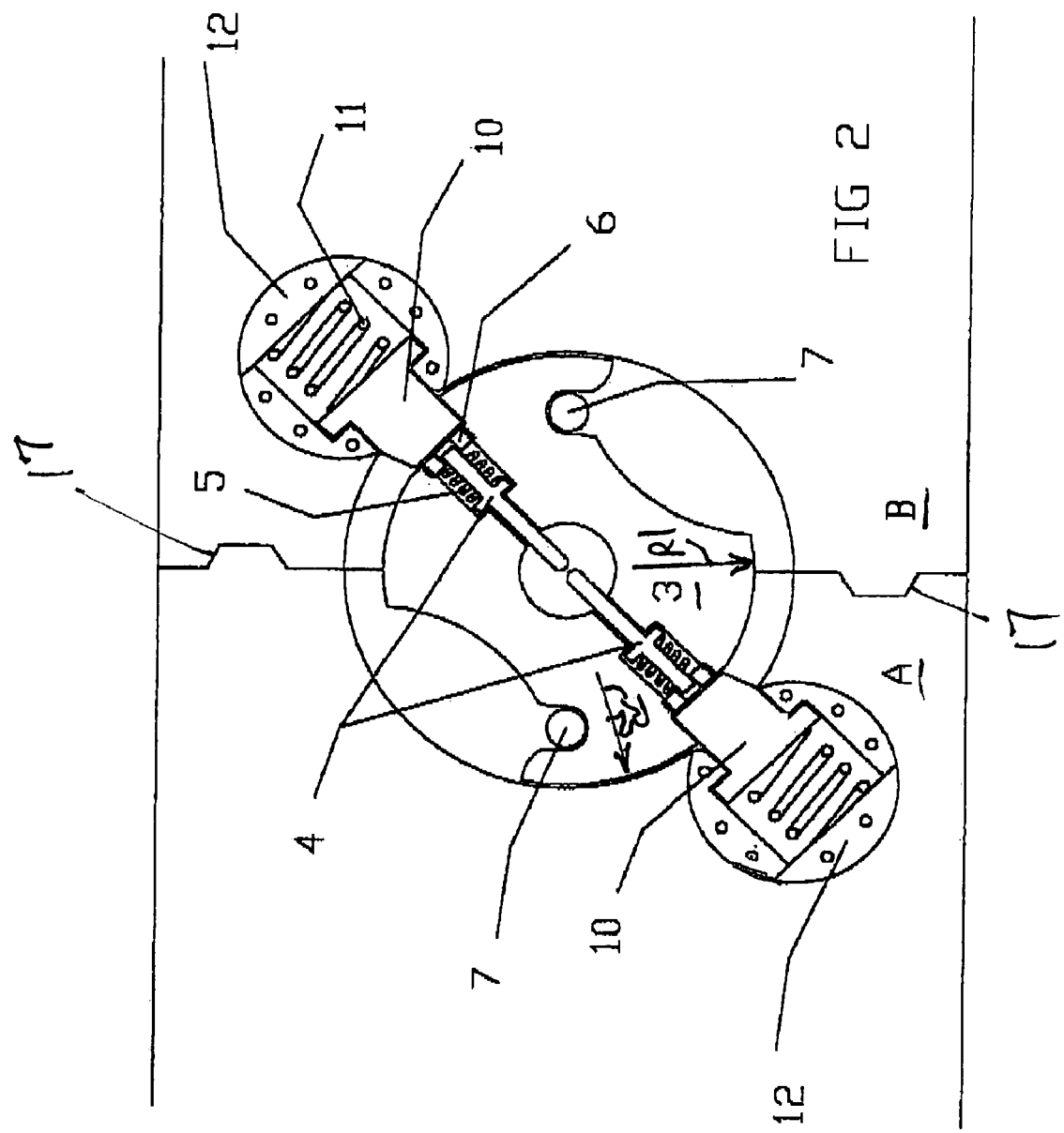
FIG. 2 is a cross sectional view from the side in which the central locking piece and the spring loaded sliders are in the fully locked position in the first embodiment.
Figure 5:
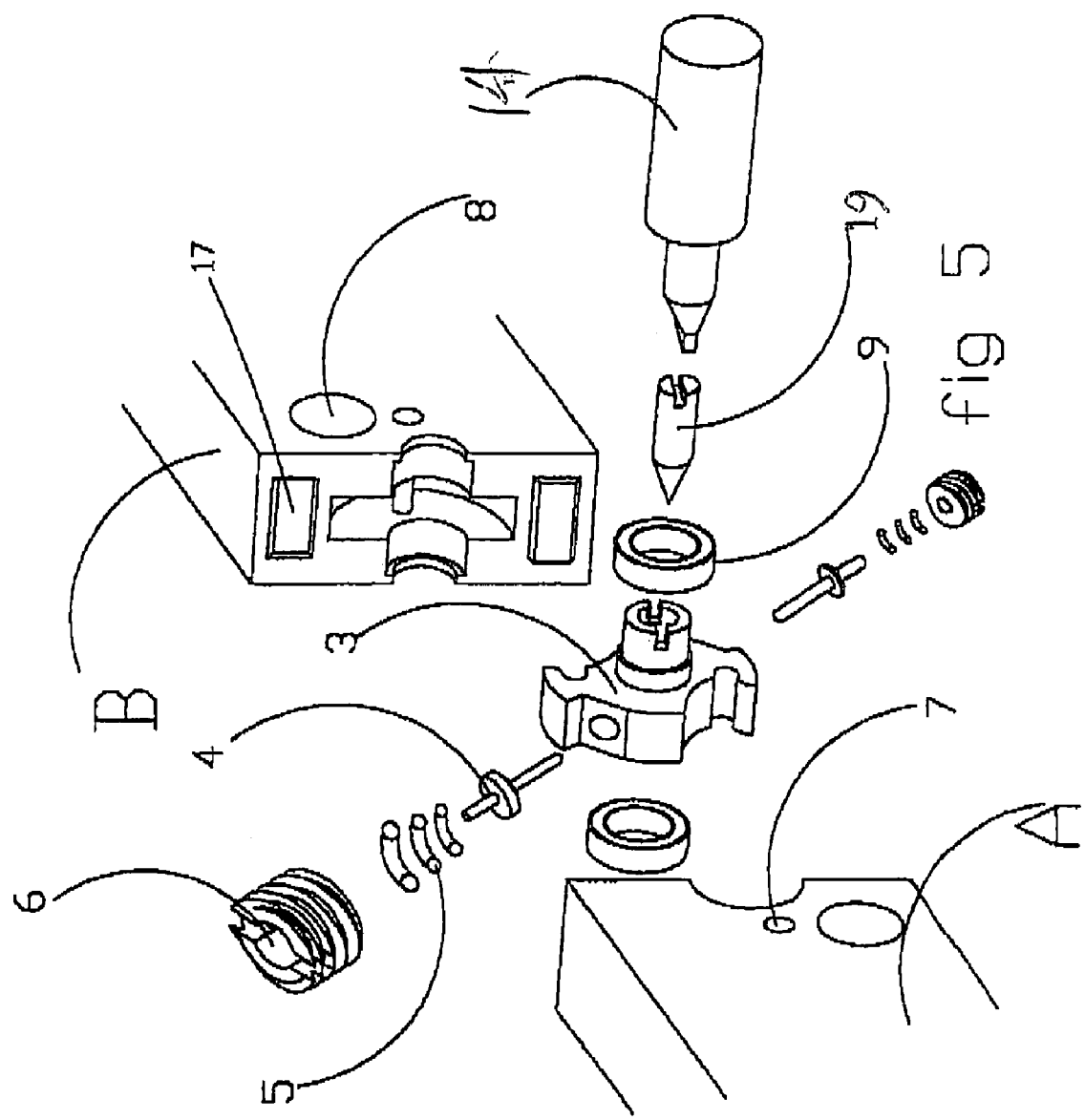
FIG. 5 is a partially exploded view of the central locking piece of the first embodiment with the rails in line with each other.

With reference to FIGS. 2 and 5, a system of the first embodiment of the present invention for joining two bodies A, B includes a first body A having a first slot in a surface thereof that is to be joined, a first pin 7 extending through the first slot, and a central locking piece 3 in and protruding from the first slot, where the central locking piece 3 has a pair of diametrically opposed notches that each receive a respective pin 7, a pair of diametrically opposed first sectors having a first radius R1, and a pair of diametrically opposed second sectors having a second radius R2 larger than the first radius. A movable first stopper 10 is provided in the first body A that is urged into the first slot to the first radius R1 at a position where the first stopper 10 engages one of the first sectors when the first pin 7 is engaged in one of the notches and one of the second sectors is between the one first sector and the notch that engages the pin 7. Each of the first and second sectors may be about 45° wide. Stopper 10 may be urged into position with a spring 11 that pushes off a wedge 12 that flattens one side of an opening in body A that can be closed with a threaded cap 8 (see also FIG. 3).

The second body B may have a second slot in a surface thereof that is to be joined to the first body A, a further pin 7 extending through the second slot, and a movable second stopper 10 in the second body that is urged into the second slot to the first radius R1 at a position where the second stopper engages the other one of the first sectors when the further pin 7 is engaged in the other one of the notches and the other one of the second sectors is between the other first sector and the other notch that engages the second pin. In other words, the slot and pin of the first body A are repeated in the second body B, and the notches on the central locking piece 3 engage the pins 7 in the first and second bodies when the central locking piece 3 is rotated to hold the two bodies together.

The system may also include a release bar 4 (see also FIG. 3) inside the first sector of the central locking piece 3 that is selectively extendable to at least the second radius R2 to push the stopper 10 out of engagement with the first sector so that the central locking piece 3 is free to rotate to disengage pins 7 from the respective notches. The release bar 4 may be urged out of engagement with stopper 10 by spring 5. The assembly containing the release bar 4 may positioned with a threaded nut 6.

As shown in FIG. 5, the surfaces of the first and second bodies A, B that are to be joined may have corresponding male and female elements 17 to prevent twisting of the bodies once they are joined. Alternatively, further pins may be used for this purpose.

As is apparent from FIG. 2, the notches that receive pins 7 may open tangentially.

Figure 3:
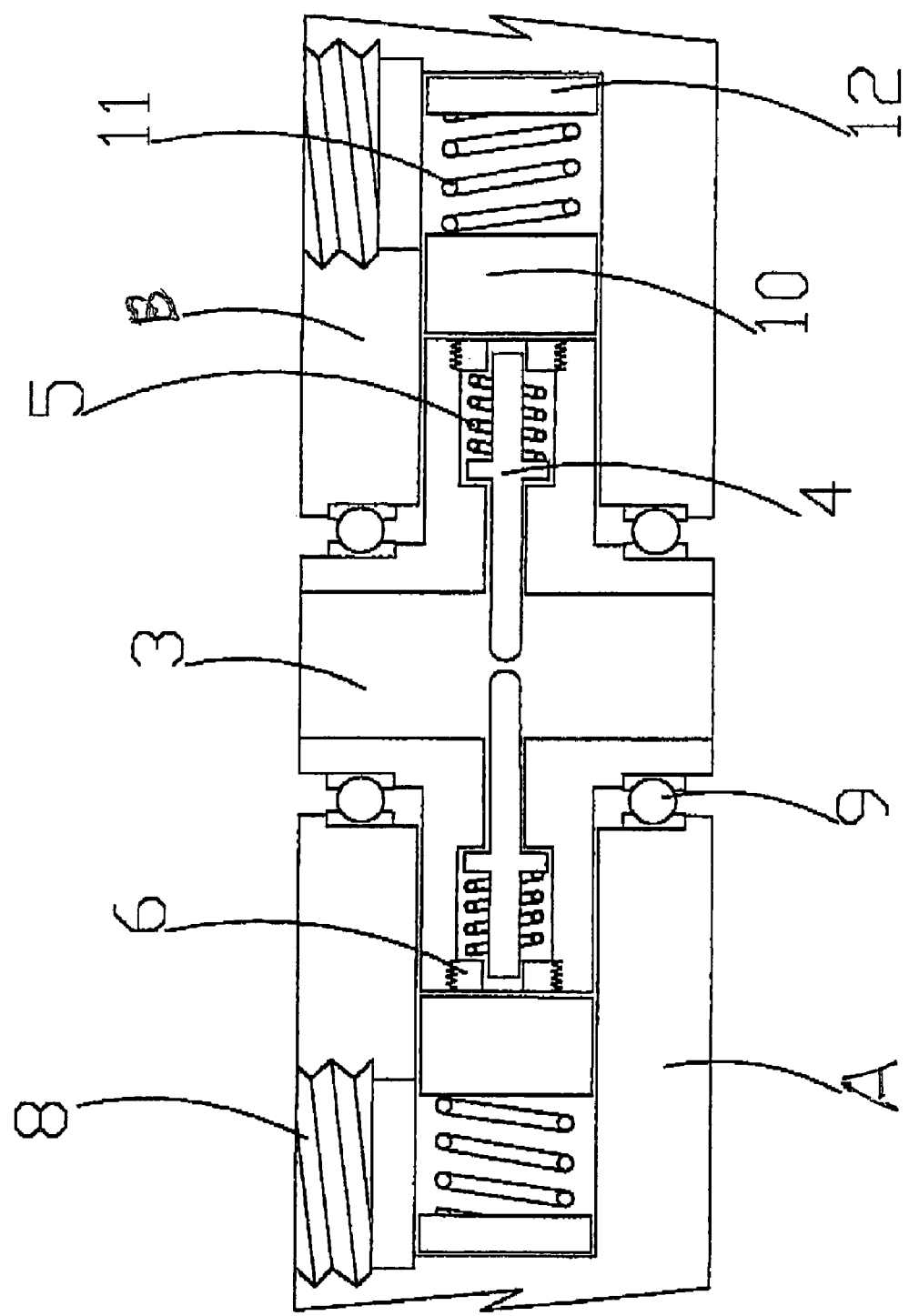
FIG. 3 is a cross sectional view showing the depth of the three pieces assembled at 45° to the axis in the first embodiment.
Figure 4:
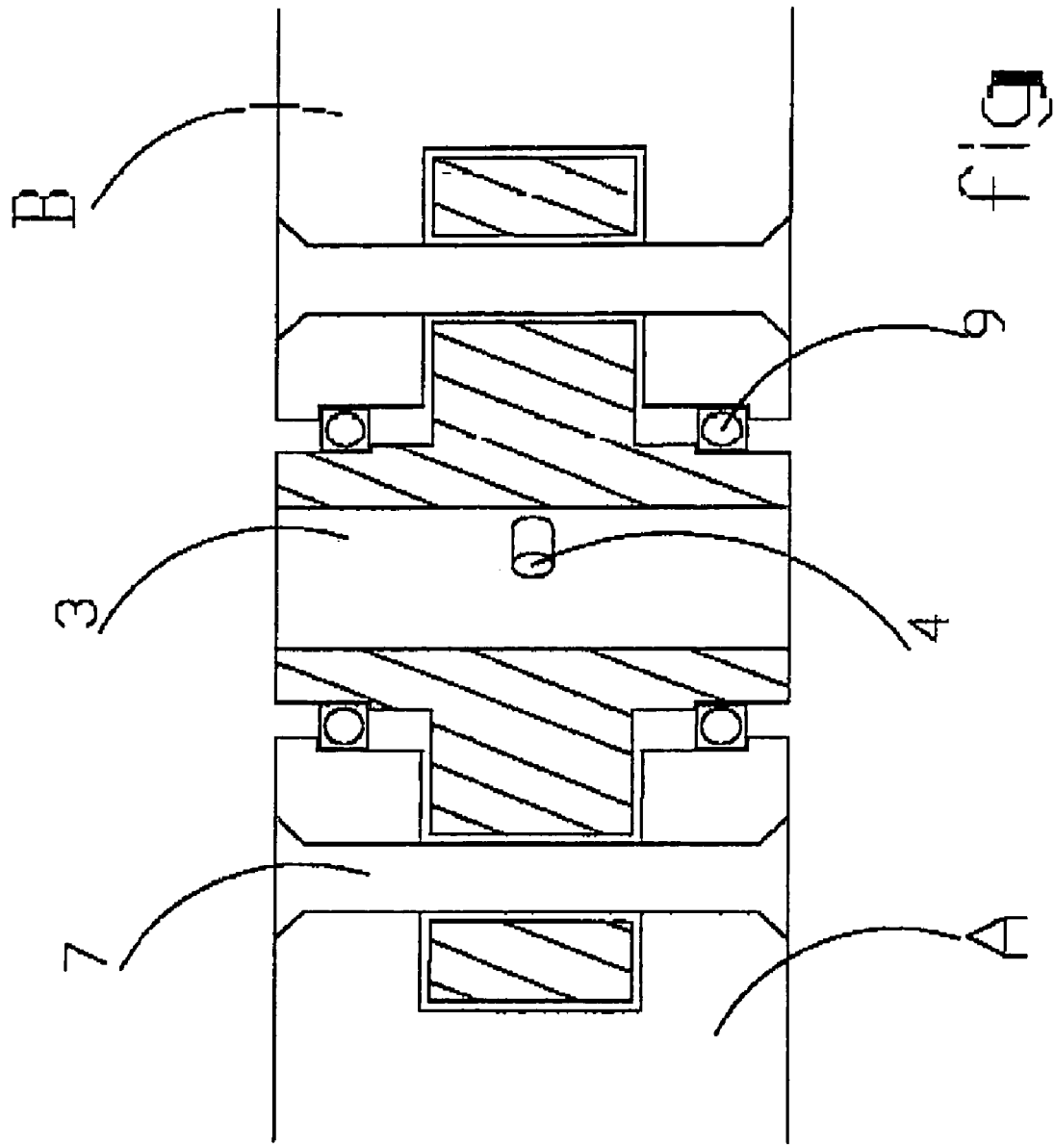
FIG. 4 is a cross sectional view at 90° to the axis in the first embodiment.
Figure 7:
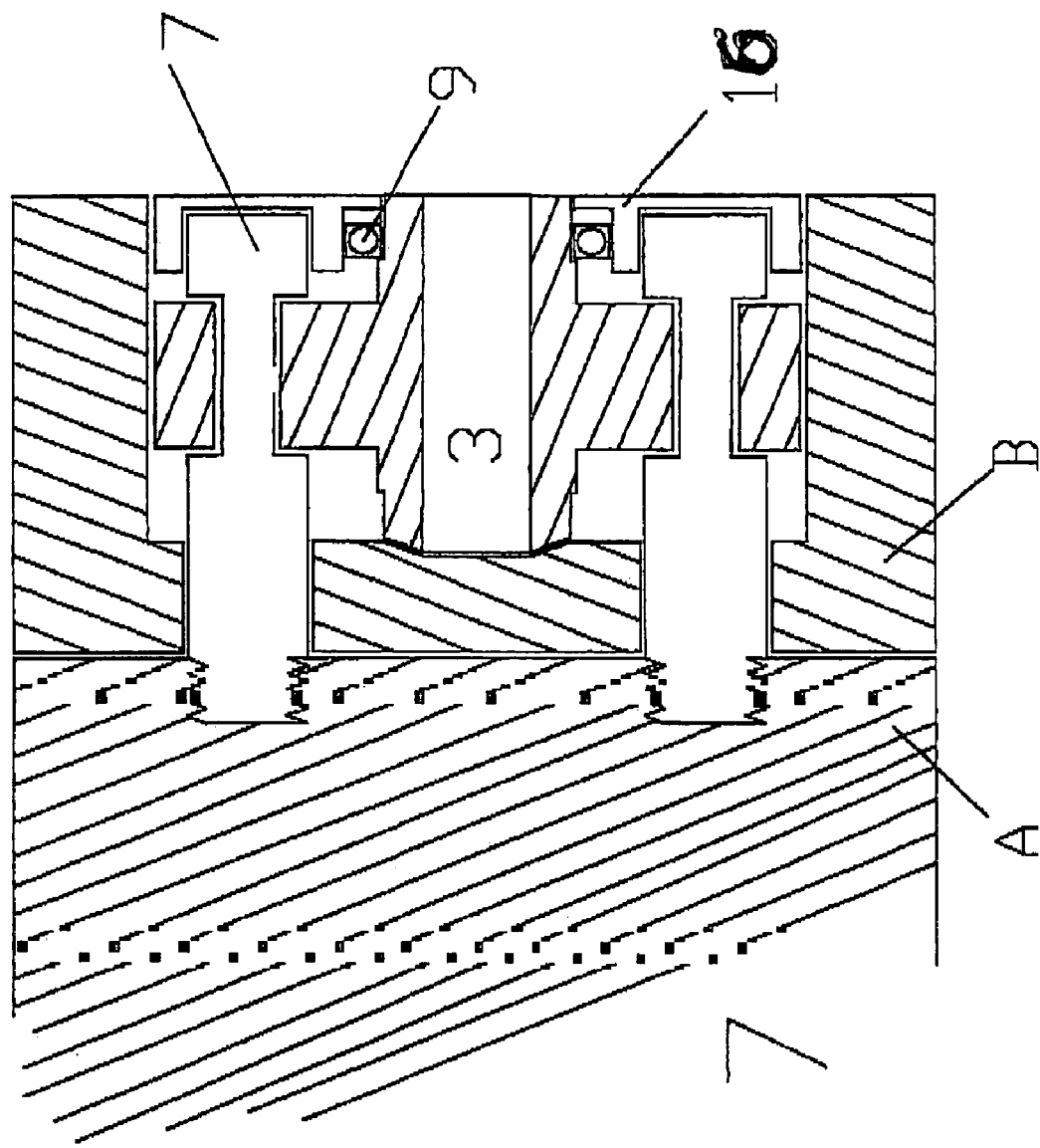
FIG. 7 is a cross sectional view of the device in the first embodiment.

As shown in FIGS. 3 and 5, rotation of central locking piece 3 may be facilitated by a bearing 9. Pins 7 may be exposed or covered with a cover 16 (FIG. 7)

Figure 8:
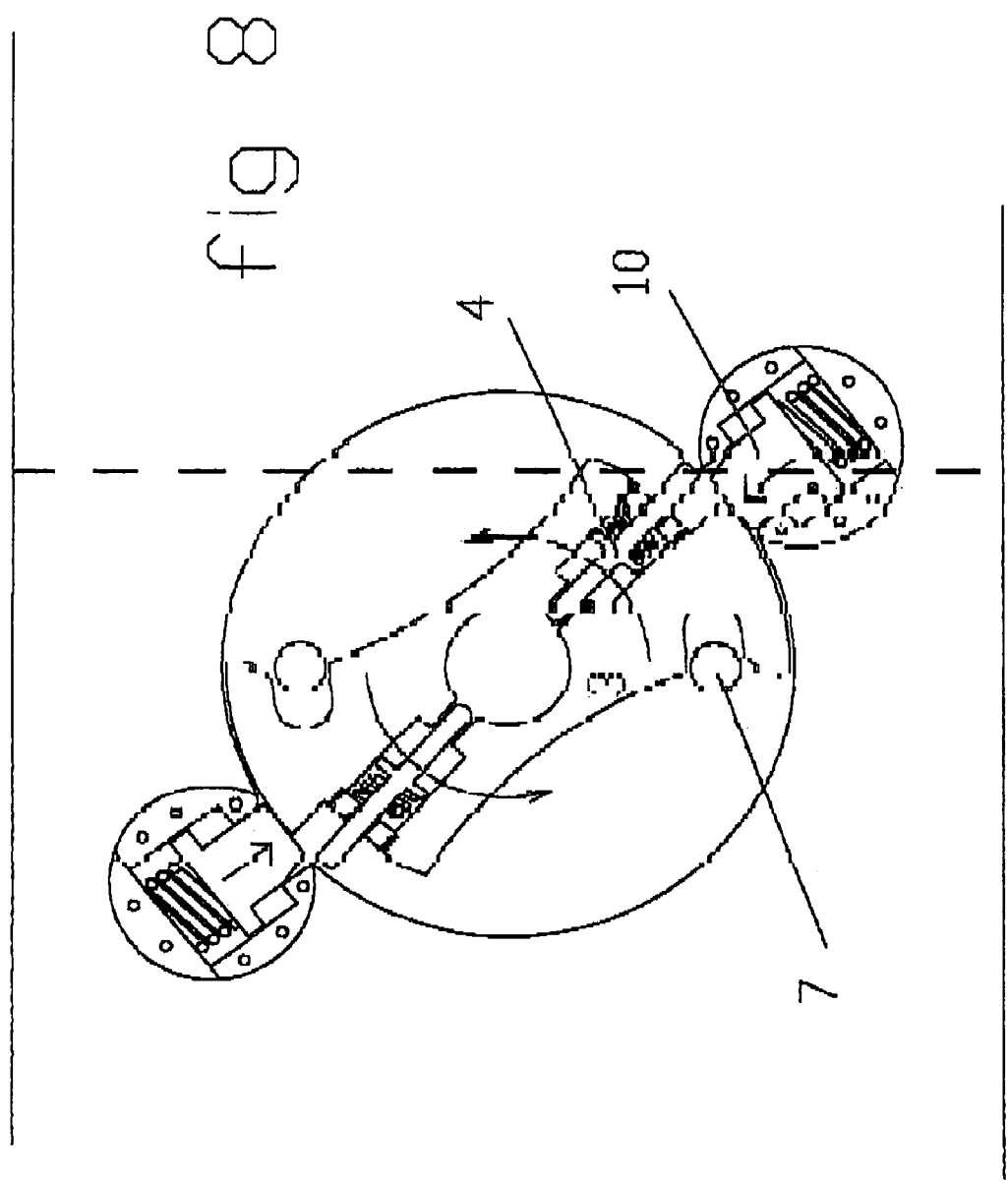
FIG. 8 shows the device in the unlocking stage in the first embodiment.

In operation, as shown in FIGS. 5 and 8, central locking piece 3 may be rotated so that pins 7 engage their respective notches by rotating central locking piece 3 with a screw driver 14 until stoppers 10 engage the first sector of the central locking piece. Pins 7 and stopper 10 act together to hold the central locking piece in position, and the pins 7 interact with the arms of the central locking piece 3 to provide the strength to hold bodies A and B together. The bodies may be released by moving release bars 4 radially outward into engagement with respective stoppers 10 and urging stoppers 10 to or beyond the second radius R2. To this end, a suitably shaped wedge or push-bar 19 may be provided. When the stoppers 10 have been moved to or beyond the second radius R2, the central locking piece 3 is free to rotate counterclockwise to release the notches from the pins and allow the two rails to separate.

Figure 6:
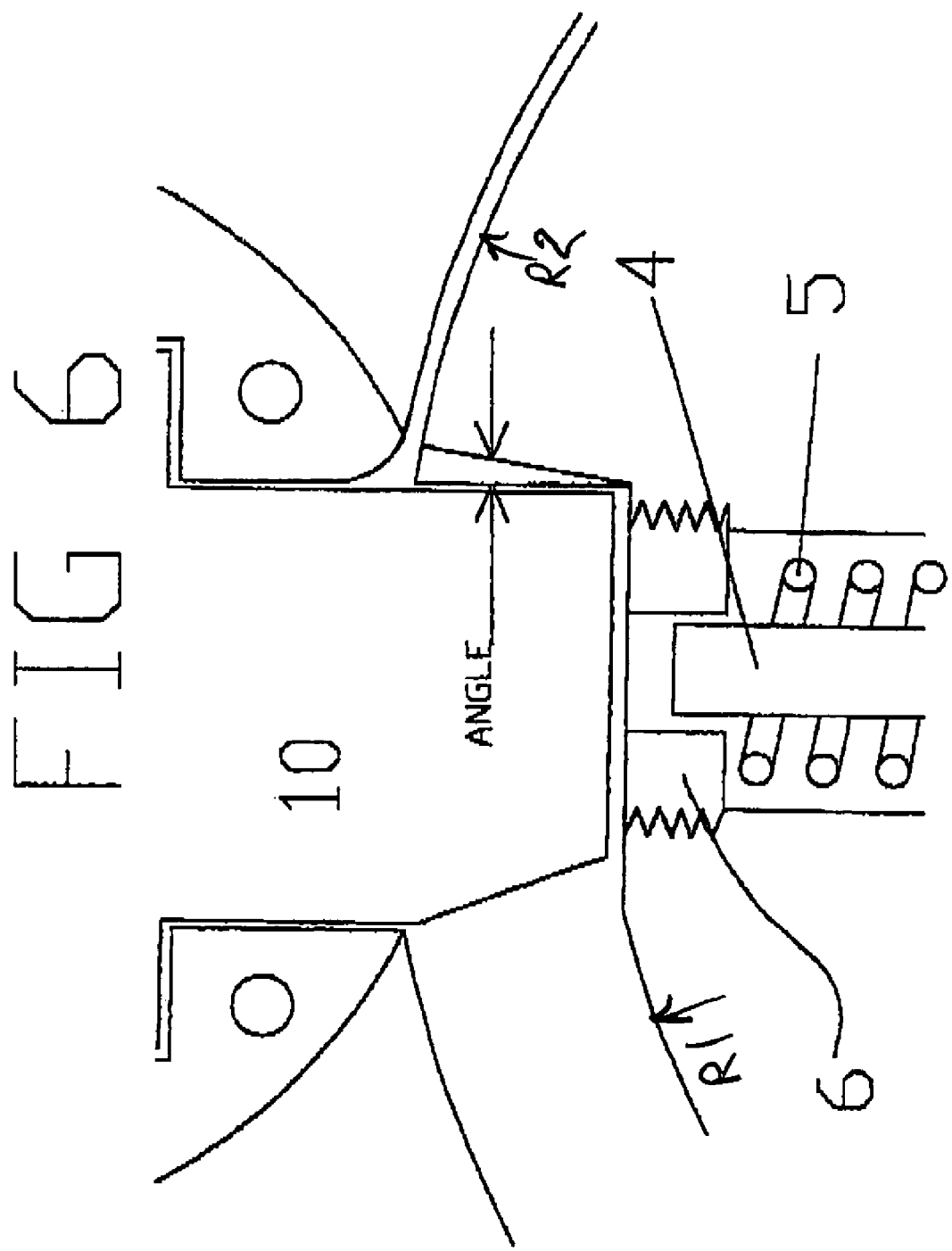
FIG. 6 shows the angle at which the central locking piece of the first embodiment is machined to allow the spring-loaded slider to engage in the locked position.

The central locking piece 3 is an independent body that is machined to accommodate releasing bars 4 that are spring loaded in their rest position. Releasing bars 4 may be set at 180° to each other. The central locking piece 3 has a hollow center to allow the wedge 19 to enter and force the pins 4 apart during unlocking only. The two notches are set at 180° to each other and engage the pins 7. A cut is machined across the diameter of the shaft ends, and this region is where the screwdriver is engaged and the central locking piece 3 is rotated, during locking/unlocking. At the point where the slider 10 locks into the central piece 3 as shown in FIG. 6 an angle is shown, this angle is not machined to the radius, rather it is parallel to the centerline of the pins 4.

Figure 9:
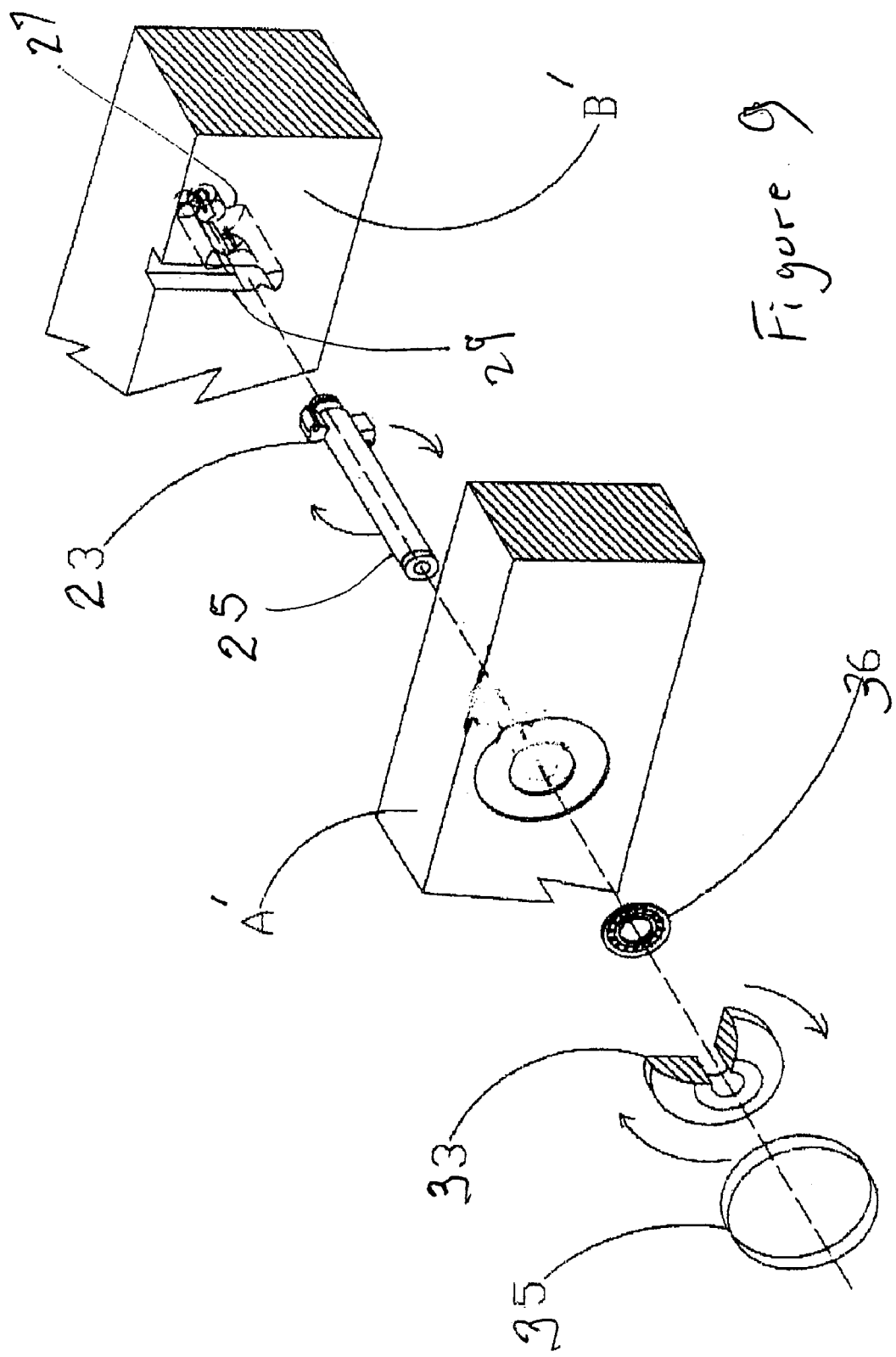
FIG. 9 is an exploded view of the second embodiment of the present invention.

A second embodiment of the present invention, the invention is a coupling device for joining two components A', B', such as shown in FIG. 9. This arrangement joins the two components side-to-side. This embodiment employs a rotatable member with diametrically opposed arms that each grabs a pin as in the first embodiment, except in this embodiment the rotatable member is entirely within a cavity in one of the components and a shaft that extends axially from the rotatable member is held by the other component. That is, in this embodiment, the components are held together by the strength of the shaft that extends between the two components.

Figure 10:
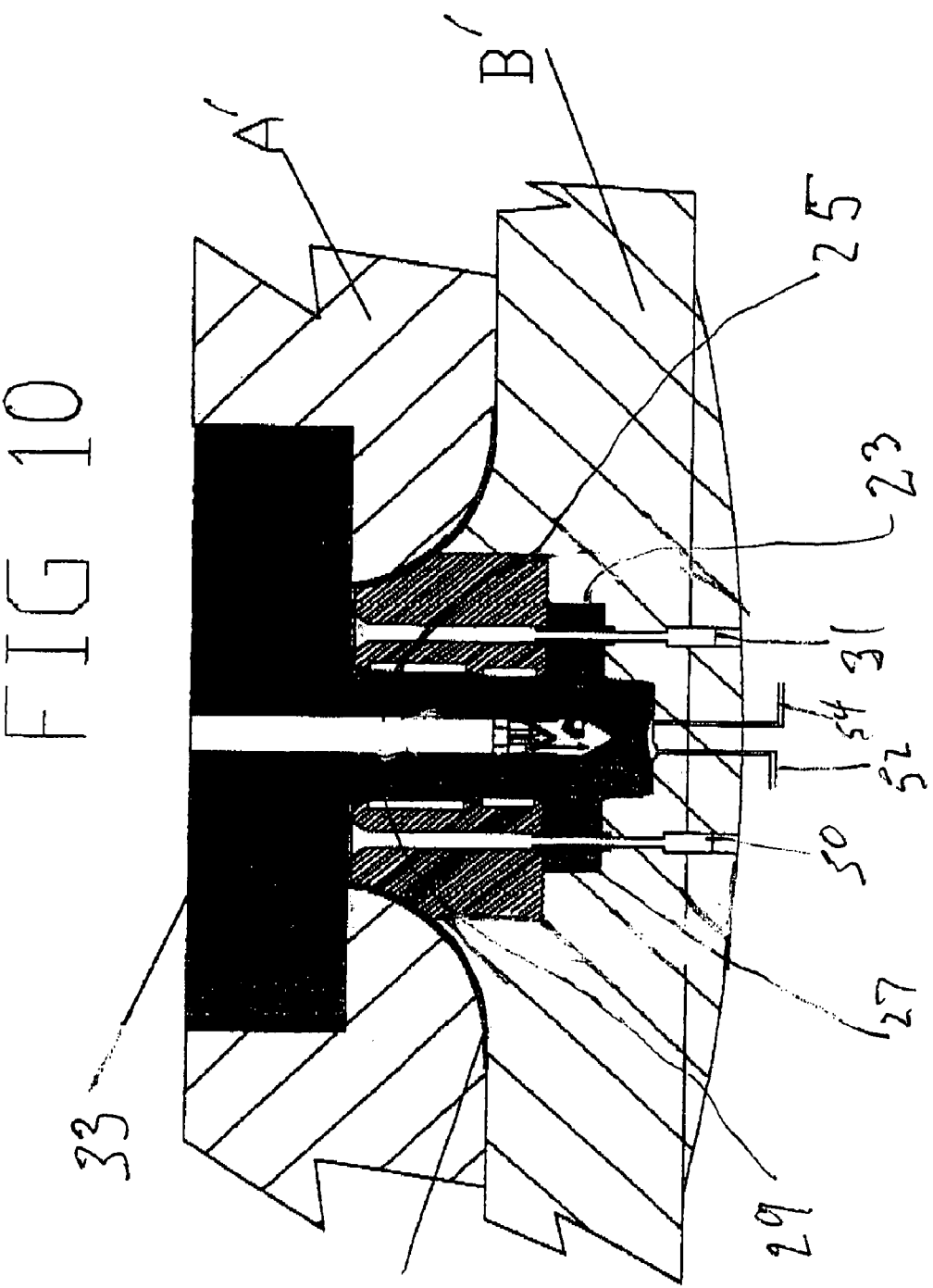
FIG. 10 is a cross section of the second embodiment.

With reference to FIG. 9, a system for joining two bodies A', B' may include a rotatable locking member 23 having a pair of diametrically opposed notches, a pair of diametrically opposed first sectors having a first radius, and a pair of diametrically opposed second sectors having a second radius larger than the first radius (such as shown in FIG. 2). A shaft 25 is attached to and extends axially from locking member 23. With reference also to FIG. 10, body B' has a cavity 27 and an opening 29 for inserting locking member 23 into cavity 27. Cavity 27 having a size permitting rotation of locking member 23 and opening 29 is smaller than cavity 27 to prohibit removal of locking member 23 from cavity 23 when locking member 23 has been rotated out of alignment with opening 29. That is, locking member 23 and shaft 25 are inserted like a key into opening 29, and after insertion locking member 23 is rotated by rotating shaft 25 so that locking member 23 is no longer in alignment with opening 29. Once rotated, locking member 23 engages the pin(s) and stopper(s) as in the first embodiment to hold locking member in place in the cavity.

As with the first embodiment, a first pin 31 extends into cavity 27 and engages one of the notches in locking member 23 when locking member 23 is rotated. As with the embodiment shown in FIG. 2, a movable first stopper is urged into the cavity to the first radius at a position where the first stopper engages one of the first sectors of locking member 23 when first pin 31 is engaged in one of the notches and one of the second sectors is between the one first sector and the notch that engages first pin 31.

The other body A' has a receptacle 33 for holding an end of shaft 25 opposite locking member 23 so that shaft 25 holds bodies A', B' together when locking member 23 is rotated to hold one end of shaft 25 in body B' and receptacle 33 holds the other end of shaft 25. Receptacle 33 may be covered with cover 35 and have a bearing 36 to facilitate rotation of shaft 25.

The release bar described in the first embodiment may be inside one first sector of locking member 23 and selectively extendable to at least the second radius to push the first stopper out of engagement with the one first sector. In contrast to the first embodiment, an actuator for the release bar may be inside shaft 25, which may be hollow such as shown in FIG. 10. The actuator may be seen more clearly in FIGS. 11a–d that show a portion of the actuator, the hollow part of the shaft in which the actuator is housed, and the actuator and release pin in the locked and unlocked positions.

Figure 11:
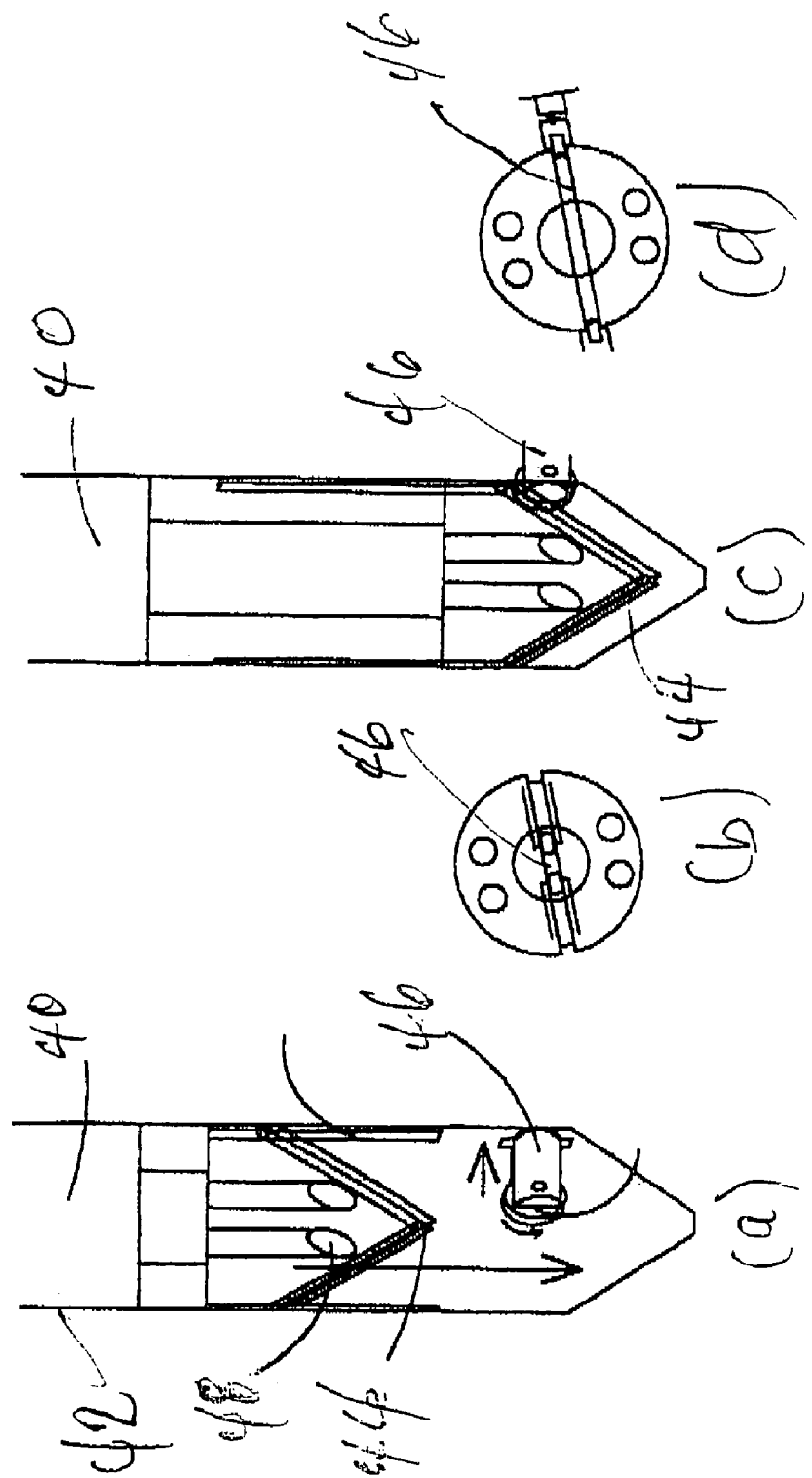
FIGS. 11a–d are schematic diagrams showing operation of the actuator of the second embodiment.

FIGS. 11a–b show the locked position, with actuator 40 in hollow shaft 42, where actuator 40 has an extensible wedge portion 44 withdrawn from engagement with release pin 46. The direction of movement of the wedge portion 44 is indicated by the arrow. When wedge portion 44 is extended as shown in FIGS. 11c–d, such as by insertion of oil from tube 48, explosively, or by other equivalent devices available to those of skill in the art, wedge portion 44 engages release pin 46 to cause it to move radially outward (as in the first embodiment) so as to release the stopper and allow rotation of the locking member 23 to release the pin 31 from the notches in locking member 23 and thereby permit withdrawal of locking member 23 from cavity 27 and separation of body A' from body B'.

As with the first embodiment, a second pin 50 extends through cavity 27 and a movable second stopper in body B' is urged into cavity 27 to the first radius at a position where the second stopper engages the other one of the first sectors when second pin 50 is engaged in the other one of the notches in locking member 23 and the other one of the second sectors is between the other first sector and the other notch that engages second pin 50. The release bar 46 may be configured to push both the first and second stoppers to at least the second radius to push the first and second stoppers out of engagement with the respective first sectors. Once the release bar has been operated, the shaft 25 may be rotated in a suitable manner, such as with a spring or mechanical linkage.

As shown in FIG. 10, the body B' may include a connection 52 to a vacuum for urging locking member 23 to remain in cavity 27, and/or a connection 54 to a source of pressure for urging locking member 23 out of cavity 27.

Figure 12:
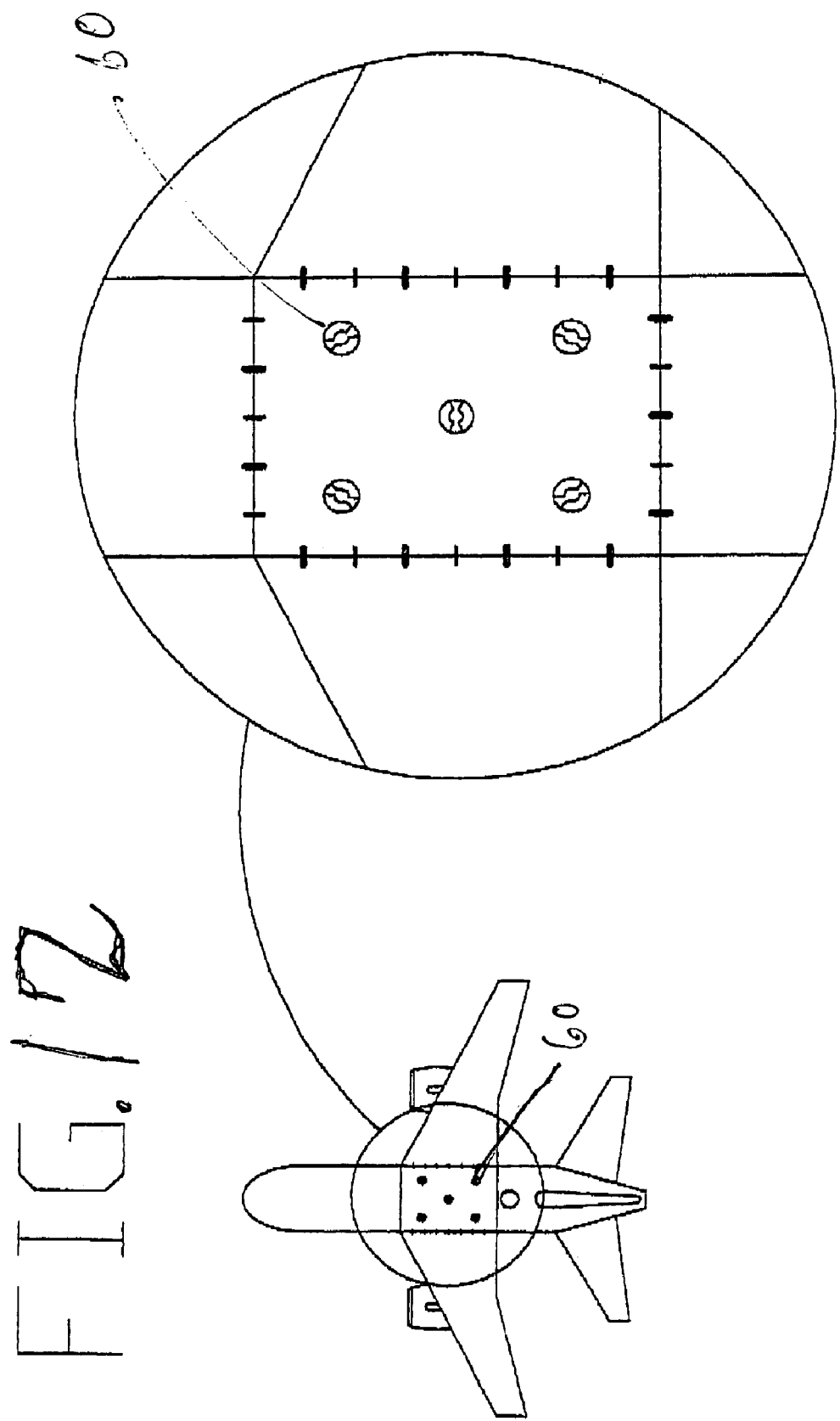
FIG. 12 is a schematic representation of an aircraft employing the device of the second embodiment.
Figure 13:
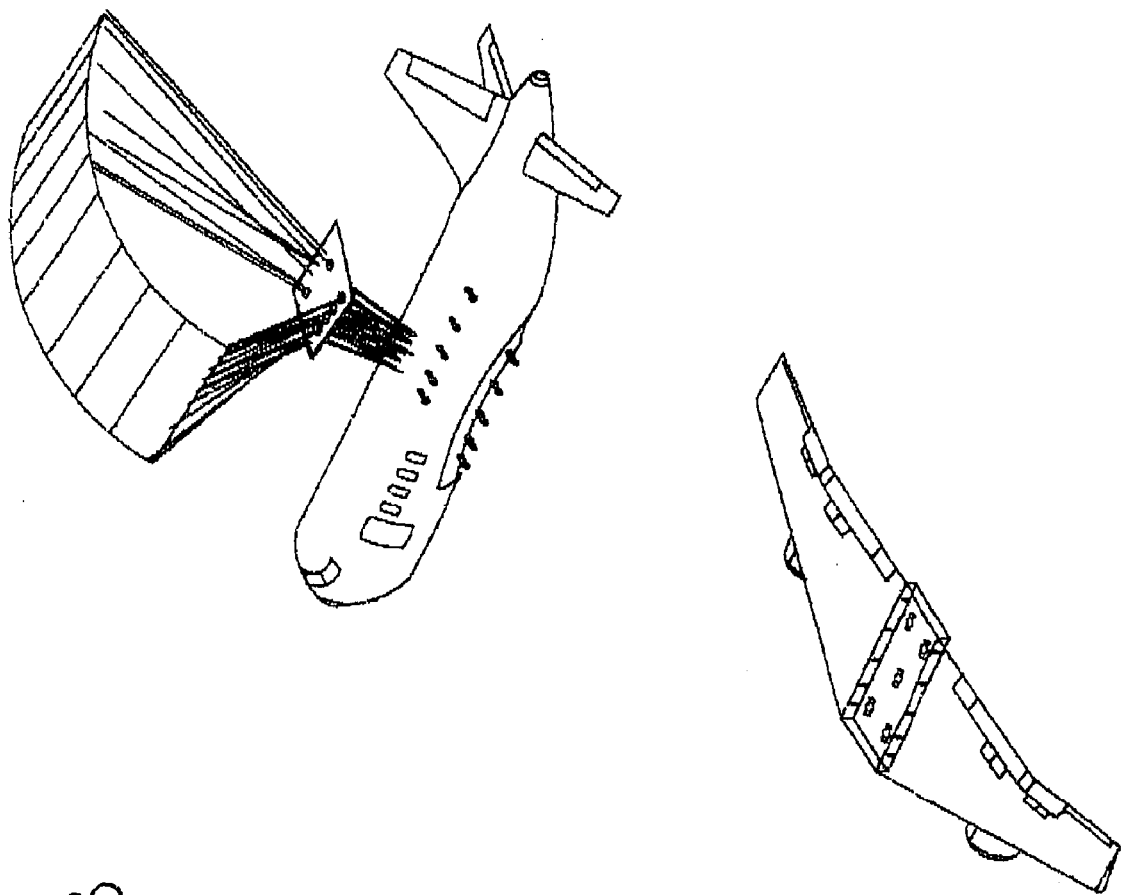
FIG. 13 is a schematic representation of the aircraft of FIG. 12 after separation of the wing assembly.

The device of the second embodiment has diverse applications, but is seen to be especially relevant where the two bodies are to be held together with certainty except in an emergency when one body is to be released from the other rapidly. For example, with reference to FIG. 12 a plurality of the devices 60 of the second embodiment may be used to hold an aircraft wing assembly or other component to an aircraft fuselage. In an emergency, the plurality of devices may be operated to release the wing assembly and permit a parachute assisted landing of the now-lighter fuselage, such as shown in FIG. 13. Other emergency and/or rapid decoupling uses of the device will be apparent to those of skill in the art.

While embodiments of the present invention have been described in the foregoing specification and drawings, it is to be understood that the present invention is defined by the following claims when read in light of the specification and drawings.

I claim:

1. A system for joining two bodies, comprising:
    a rotatable locking member having a pair of diametrically opposed notches, a pair of diametrically opposed first sectors having a first radius, and a pair of diametrically opposed second sectors having a second radius larger than said first radius;
    a shaft attached to and extending axially from said locking member;
    a first body having a cavity and an opening for inserting said locking member into said cavity, said cavity having a size permitting rotation of said locking member and said opening being smaller than said cavity to prohibit removal of said locking member from said cavity when said locking member has been rotated out of alignment with said opening;
    a first pin extending into said cavity; and
    a movable first stopper in said first body and that is urged into said cavity to said first radius at a position where said first stopper engages one of said first sectors when said first pin is engaged in one of said notches and one of said second sectors is between said one first sector and said notch that engages said first pin.

2. The system of claim 1, further comprising a release bar inside said one first sector of said locking member and that is selectively extendable to at least said second radius to push said first stopper out of engagement with said one first sector.

3. The system of claim 2, further comprising an actuator inside said shaft and that selectively engages and extends said release bar.

4. The system of claim 3, wherein said actuator comprises a wedge that is movable within said shaft toward said locking member and into engagement with said release bar.

5. The system of claim 1, further comprising a second body having a receptacle for holding an end of said shaft opposite said locking member so that said shaft holds said first and second bodies together when said locking member is rotated so that said first stopper engages one of said first sectors when said first pin is engaged in one of said notches and one of said second sectors is between said one first sector and said notch that engages said first pin.

6. The system of claim 1, further comprising a second pin extending through said cavity, and a movable second stopper in said first body and that is urged into said cavity to said first radius at a position where said second stopper engages the other one of said first sectors when said second pin is engaged in the other one of said notches and the other one of said second sectors is between said other first sector and said other notch that engages said second pin.

7. The system of claim 6, further comprising a release bar inside said first sectors of said disc that is selectively extendable in diametrically opposed directions to at least said second radius to push said first and second stoppers out of engagement with said respective first sectors.

8. The system of claim 7, further comprising an actuator inside said shaft and that selectively engages and extends said release bar.

9. The system of claim 1, wherein said first body comprises a connection to a vacuum for urging said locking member to remain in said cavity.

10. The system of claim 1, wherein said first body comprises a connection to a source of pressure for urging said locking member out of said cavity.

11. The system of claim 1, wherein said first body is one of an aircraft fuselage and a structure to be released from an aircraft fuselage.

12. A system for joining two components, comprising:
    a rotatable disc in a cavity in one component, said disc having a pair of diametrically opposed notches, a pair of diametrically opposed first sectors having a first radius, and a pair of diametrically opposed second sectors having a second radius larger than the first radius;
    two spaced-apart pins extending into said cavity;
    the one component having an opening smaller than said cavity and through which said disc is inserted, said cavity being large enough to permit rotation of said disc when said disc is inserted therein;
    movable stoppers in the one component that are urged into said cavity at a position where each said stopper engages one of said first sectors when said pins engage respective ones of said notches; and
    a shaft extending axially from said disc through said opening and having a distal end that engages a second component so that said shaft holds the two components together when said disc is in said cavity and rotated so that said pins engage respective ones of said notches and said distal end of said shaft is held by the second component.

13. The system of claim 12, further comprising a release bar inside said first sectors of said disc that is selectively extendable in diametrically opposed directions to at least said second radius to push said first and second stoppers out of engagement with said respective first sectors.

14. The system of claim 13, further comprising an actuator inside said shaft and that selectively engages and extends said release bar.

* * * * *